United States Patent [19]
Mezhinsky

[11] Patent Number: 5,230,300
[45] Date of Patent: Jul. 27, 1993

[54] AUTOMATIC DRY FOOD FEEDER FOR ANIMALS

[76] Inventor: Victor Mezhinsky, 740 N. Driftwood, Brea, Calif. 92621

[21] Appl. No.: 915,271

[22] Filed: Jul. 20, 1992

[51] Int. Cl.⁵ .................................................. A01K 5/02
[52] U.S. Cl. .................................... 119/51.11; 119/56.1
[58] Field of Search ............... 119/51.11, 51.12, 51.13, 119/51.14, 51.15, 56.1, 51.5, 52.1; 222/136, 411

[56] References Cited

U.S. PATENT DOCUMENTS

| | | |
|---|---|---|
| 3,144,002 | 8/1964 | Vilain ................................. 119/56.1 |
| 3,256,861 | 6/1966 | Giltner . |
| 3,450,101 | 6/1969 | Avera . |
| 3,527,191 | 9/1970 | Kawecki et al. . |
| 3,716,172 | 2/1973 | Crippen . |
| 3,800,745 | 4/1974 | Fassauer . |
| 4,079,699 | 3/1978 | Longmore et al. . |
| 4,235,200 | 11/1980 | Shay . |
| 4,279,221 | 7/1981 | Arvizu ................................. 119/51.11 |
| 4,284,035 | 8/1981 | White . |
| 4,497,280 | 2/1985 | Sanstrom et al. . |
| 4,688,520 | 8/1987 | Parks . |
| 4,722,300 | 2/1988 | Walker et al. . |
| 4,733,634 | 3/1988 | Hooser ................................. 119/51.12 |
| 4,735,171 | 4/1988 | Essex ................................... 119/51.12 |
| 4,993,364 | 2/1991 | Hessenauer ......................... 119/51.11 |

Primary Examiner—Gene Mancene
Assistant Examiner—Thomas Price
Attorney, Agent, or Firm—Howard A. Kenyon

[57] ABSTRACT

An automatic dry food feeder for animals is described. The feeder consists of a housing with a hopper fitted in the housing having sloping members terminating in a rectangular section at the bottom of the hopper. An electric motor having a gearbox attached thereto is located outside the rectangular portion of the hopper. The gearbox shaft extends into the rectangular portion with a sleeve fitted over the shaft. Attached to the sleeve are segmented flexible vanes that rotate in accordance with the signal provided by an electronic programmable controller. Rotating the segmented flexible vanes a prescribed amount in response to a programmed timer dispenses a measured amount of dry animal food into a tray.

15 Claims, 2 Drawing Sheets

AUTOMATIC DRY FOOD FEEDER FOR ANIMALS

BACKGROUND OF THE INVENTION

1. Field of the Invention

This invention relates to an animal feeder to dispense a measured amount of dry animal feed into a tray.

2. Description of the Prior Art

Numerous automatically operated food dispensers have been devised for the feeding of dry food to animals. Such devices have the disadvantage of being unduly complicated with both mechanical and electrical devices being heavy and cumbersome and were so expensive that there was limited cliental that could afford such feeders.

Prior devices such as U.S. Pat. Nos. 3,800,745, 4,722,300 and 3,206,861 use agitator or vibrating means to dispense the dry animal food. U.S. Pat. Nos. 4,284,035 and 4,688,520 use a auger to dispense food and U.S. Pat. No. 4,688,520 adds water.

U.S. Pat. No. 4,497,280 uses a gate that opens to dispense food and U.S. Pat. No. 4,235,200 uses a pivoting scoop while U.S. Pat. No. 4,279,221 uses a rotating scoop. U.S. Pat. No. 4,079,699 uses a weight sensitive means to dispense food while U.S. Pat. No. 3,295,838 is a conditioner for premoistening dry power food. While U.S. Pat. No. 4,079,699 feeds the dry powders with rotating blades, the apparatus feeding the powders with rotating blades, the apparatus feeding the powders is keyed to providing corresponding amount of water. As can be seen there has been an abundance of animal feeders to provide food for an animal while the owner is away. None of these feeders have been a commercial success.

What is needed is a simple, low cost, high reliability animal feeder that can provide a measured amount of dry animal food at timed intervals.

SUMMARY OF THE INVENTION

It is the primary object of this invention to provide an apparatus for controlling the disbursement of dry animal food at predetermined intervals.

It is another object of this invention to provide means for starting and stopping the animal dry food dispenser.

It is still another object of this invention to provide a dispensing system that will not jam, from dry food being wedged in the mechanism.

It is yet another object to provide a single controller that can turn electrical power on and off at required intervals.

Briefly, in accordance with this invention, there is provided a housing having a hopper attached inside the housing. The hopper is tapered on 3 sides terminating in a rectangular structure at the bottom of the hopper. Outside of the hopper, but attached thereto, is a motor and a gearbox which is attached to the shaft end of the motor. The gearbox has a shaft extending into the rectangular structure of the hopper. Attached to this gearbox shaft is a sleeve that is keyed to the gearbox shaft and the sleeve has a plurality of flexible vanes attached thereto. The vanes are segmented in one embodiment to allow more flexibility in dispensing food. The rectangular structure at the bottom of the hopper has only side members attached to the hopper. This allows an opening proximate to the front member of the hopper to allow the dry animal food to fall into a removable tray. An electric controller which can be set at timed intervals to turn the power on and off and for programmed duration of time to the electric motor is attached to the outside of the housing. An electrical conductor is connected to the electronic controller, the motor and further connected to a 24 volt adapter which si connected to house current.

Other objects and advantages will become apparent from the following description and appended claims taken in conjunction with the accompanying drawings.

DETAILED DESCRIPTION OF THE INVENTION

Figure 1:
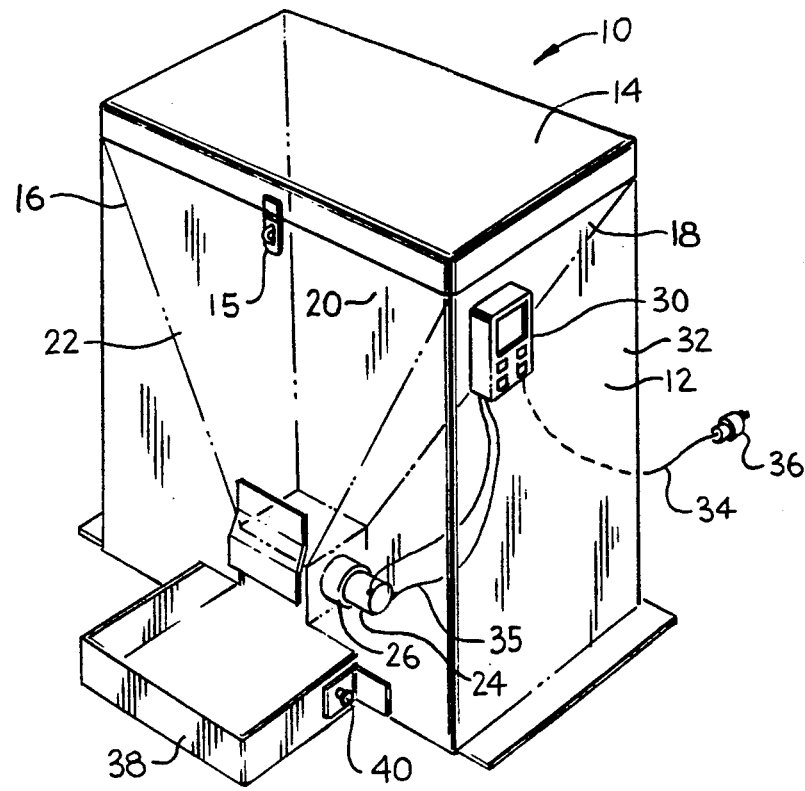
FIG. 1 is a perspective view of the automatic dry food feeder for animals with some of the internal items in phantom.
Figure 3:
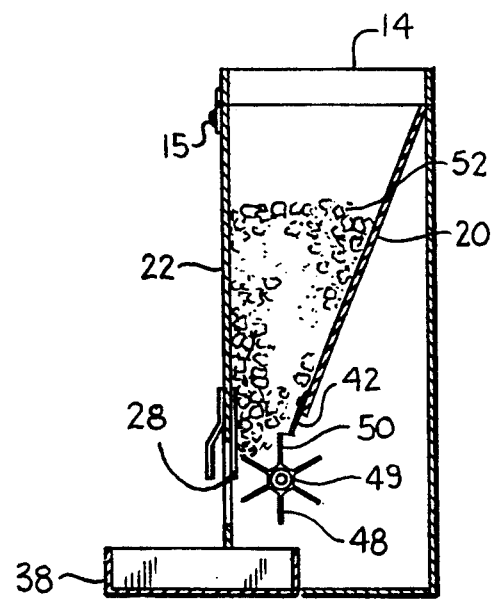
FIG. 3 is a cut-away side view showing a plurality of vanes and the flexible strips attached of the rear of the hopper and the front of the housing.

Referring to FIG. 1 there is shown at 10 a perspective drawing of the present invention, an automatic dry food feeder for animals. A housing 2 with hinged top 14 and latch 15 is also shown. Inside of housing 12 is a hopper with sloping sides 16 and 18 and sloping back 20. The front wall of the hopper 22 as seen in FIG. 3 does not slope and is also the front wall of the housing 12. Also seen is FIG. 1 is the motor 24, the gearbox 26 and a flexible strip 28 attached to the bottom of the front wall of the hopper 22. The programmable electronic timer controller 30 is attached to the side wall 32 of the housing 12. Electrical conductor 35 connects the programmable electronic control 30 to a 24 volt motor 24. An electric conductor 34 connects a 24 volt adapter 36, which is plugged into house current, to the programmable electronic timer controller 30. Also shown in this view is a removable tray 38 to contain the dispensed dry animal food. The tray 38 has quick release devices 40 to be able to remove and clean the tray 38.

Figure 2:
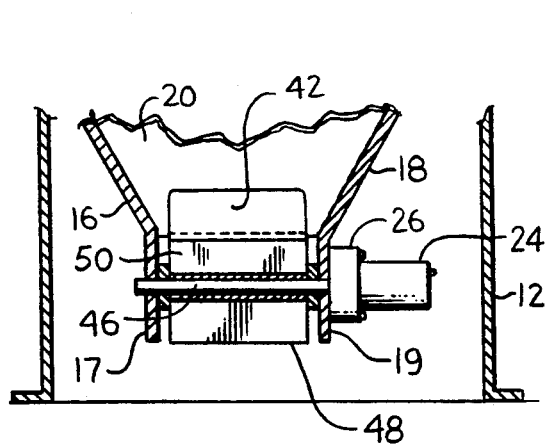
FIG. 2 shows a cut-away showing the motor, gearbox and vanes attached to a sleeve.

Turning now to FIG. 2 a partial section there is shown two sides of the rectangular portion of the hopper 17 and 19 attached to hopper sides 16 and 18 respectively. The sides of housing 12 are also shown. In this view a flexible strip 42 attached to the rear wall 20 of the hopper is shown along with motor 24 and gearbox 26. Gearbox shaft 46 and vanes 48 and 50 attached to sleeve 51 can also be seen in this view.

Turning now to FIG. 3 there is seen front wall 22 of the housing 12 having a hinged top 14, with latch 15. The dry animal food 52 is this view is seen inside the hopper. Sections of flexible strips 42 and 28 can be seen along with a plurality of vanes. A vane assembly 49 showing vanes 48 and 50 can be seen to this view as was shown in FIG. 2. A section of the removable tray 38 is also shown.

Figure 4:
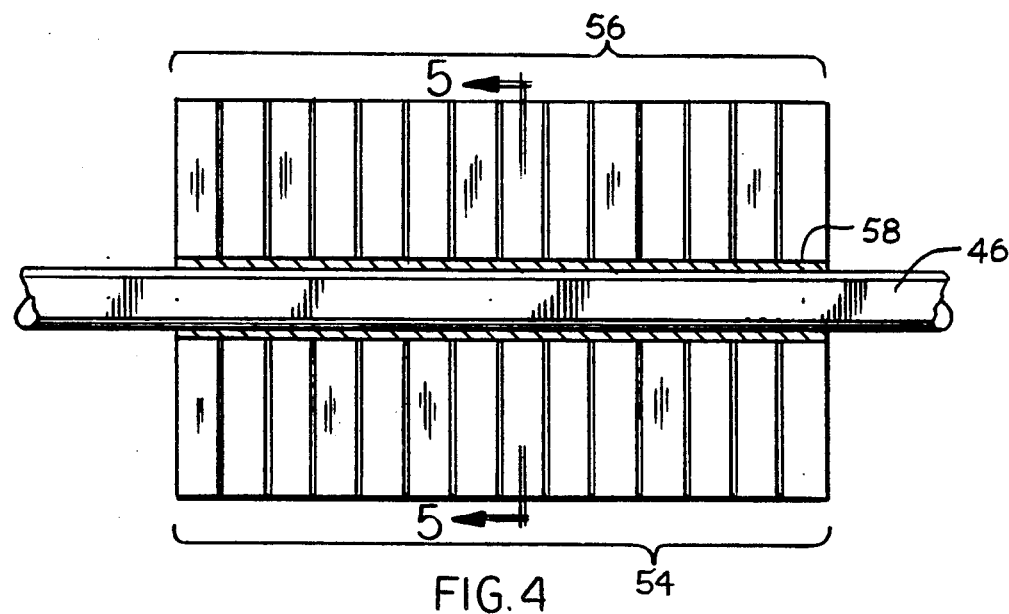
FIG. 4 shows the preferred embodiment of vane configuration which are individual flexible segments.
Figure 5:
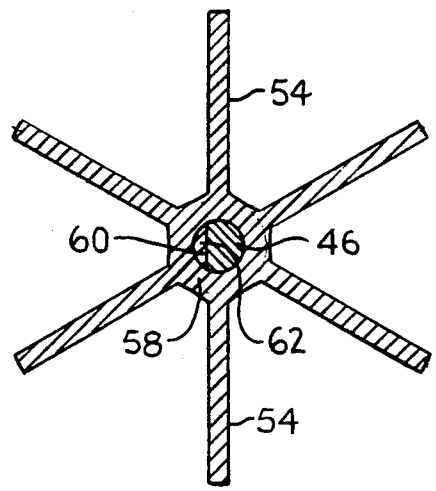
FIG. 5—5 shows a plurality of vanes with an end view of the sleeve and shaft.

FIG. 4 shows an isolated view of two vanes 54 and 56 attached to a sleeve 58. Vanes 54 and 56, which is the preferred embodiment of vanes, are segmented and flexible to insure that the dry animal food will not jam the motor 24 and gearbox 26 combination. The gearbox shaft 46 is shown fitted into sleeve 58. Section 5—5 shown as FIG. 5—5 provides a cross section of a plurality of one segment of vanes including vanes 54 and 56 shown in FIG. 4. In FIG. 5—5 the end of the gearbox shaft 46 is shown inside sleeve 58. As can be seen, the gearbox shaft 46 contains a flat side 60 that mates with a lug 62 that is a permanent part of sleeve 58. This allows the sleeve 58 and the plurality of vanes to turn as the gearbox shaft 46 turns.

Figure 6:
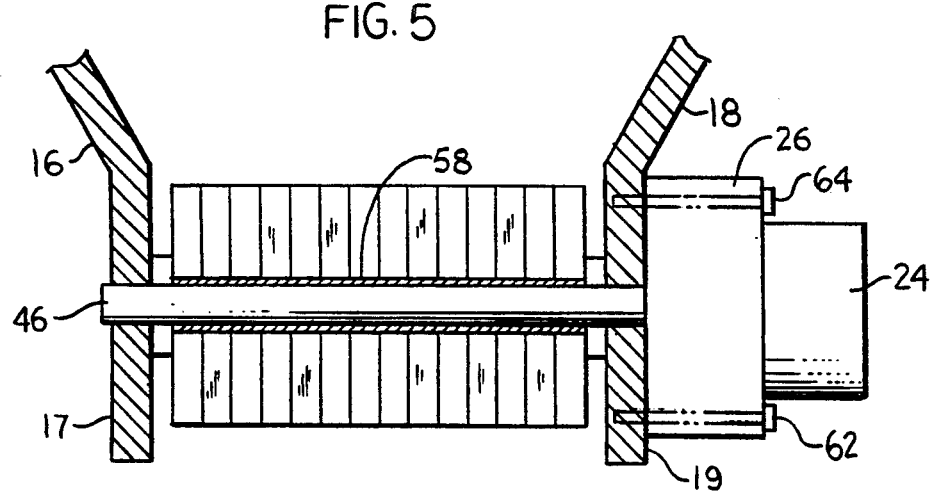
FIG. 6 is the preferred embodiment fitted into the rectangular portion of the of the hopper.

FIG. 6 shows the preferred embodiment of flexible segmented vanes in the rectangular portion 22 of the hopper. The sloping walls 16 and 18 of the hopper is given along with motor 24 and gearbox 26. The motor 24 is attached to the gearbox 26 by threaded bolts (not shown) and the gearbox is attached to the rectangular portion 22 of the hopper by threaded bolts 62 and 64. Gearbox shaft 46 and sleeve 58 is also shown. Although the motor and gearbox are described as separate units for simplicity, the combination of motor and gearbox are commercially available in one unit and are called "gearmotors".

The operation of automatic dry food feeder for animals 10 is simple in operation. A conductor 34 connects the 24 volt adapter 36 in FIG. 1 to the programmable electronic timer controller 30. Timer Controller 30 is available from several manufacturers of controllers such as Honeywell and Robert Shaw. The programmable electronic timer controller 30 must be capable, however, of starting and stopping in minutes or fractions of a minute. The motor 24 is a low 24 volt fractional horsepower since the ration of motor shaft speed to gearbox shaft speed is approximately 3,000 to 1. A relatively inexpensive gearbox and motor combination can be procured from Howard Industries or Merkle Korff Industries. The elapsed time when the programmable electronic timer controller 30 sends power to the motor 24 must be determined experimentally since the amount of dry food 52 dispensed will be a function of the size of the dry food and consumption by the animal. When the power is turned off to the motor 24 by the programmable electronic timer controller 30, the inertia in the gearbox will act as a brake and will the dot stop the vanes in the vane assembly 49 form rotating. The rotation of the vanes in the present invention is counter-clockwise as viewed from the motor and gearbox end of the vane assembly 49. The daily times that the dry animal food 52 will be dispensed will depend on the food size and the size, number and kind of animals and must be determined experimentally. An approximate time schedule will be suggested by the product manufacturer.

Thus, it is apparent that there has been provided in accordance with the invention, an automatic dry food feeder for animals that fully satisfies the objectives, aims and advantages set forth above. While the invention has been describe din conjunction with the specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A dispenser of dry animal food comprising:
    a housing having a front wall, a back wall and two side walls, said housing having an open bottom, a hinged top cover and a front latch, a hopper located and attached inside said housing, said hopper having a wide top portion, a narrow bottom portion, said bottom portion forming a rectangle having a back wall and two side walls, said hopper holding said dry animal food, a removable tray attached to the bottom of the front wall of said housing, a programmable electronically activated food dispenser having an electric motor having a shaft and a shaft end, a gearbox attached to said shaft end, said motor with said shaft of said motor engaging said gearbox, said gearbox having a shaft projecting from said gearbox, a plurality of straight rectangular vanes having two ends and two edges, one of said edges being attached to a sleeve which is fitted over said shaft protruding from said gearbox, a shaped bore in said sleeve matching a shape on said shaft protruding from said gearbox, a programmable electronic timer controller attached to said side of said housing, a source of electricity for energizing said electric motor and said programmable electronic timer controller, said plurality of straight vanes located inside said rectangular portion of said hopper, said straight vane ends being proximate to said sides of said rectangular portion of said hopper, said front wall of said hopper is the front wall of said housing, said rear wall and said side walls extend sloping inwardly and downwardly, terminating at said bottom of said hopper, said rear wall of said hopper has a bottom edge with a flexible strip attached thereto, said flexible strip engaging said straight vanes, said front wall of said housing had a bottom edge with a flexible strip attached thereto, said flexible strip engaging said straight vanes whereby energizing said motor by said programmable electronic timer controller causes said vanes to rotate a prescribed amount and dispense a measured amount of dry animal food in said removable tray.

2. A dispenser of dry animal food as describe in claim 1 wherein said straight rectangular vanes are flexible and segmented.

3. A dispenser of dry animal food comprising:
    a housing having a front wall, a back wall and two side walls, said housing having an open bottom and a hinged top cover with a front latch;
    a hopper located and attached inside said housing, said hopper having a wide top portion, a narrow bottom portion, said bottom portion forming a rectangle, having a back wall, two side walls and a bottom, said hopper holding dry animal food;
    a removable tray attached to the bottom of the front wall of said housing to hold dispensed dry animal food;
    a programmable electronically activated food dispenser located and attached at the bottom of said hopper having an electric motor, said motor having a shaft with a shaft wend, said shaft end having a gear box attached thereto, said gear box having a shaft projecting therefrom, said projecting shaft having a sleeve fitted thereon, said sleeve having a shaped bore matching a shape on said protruding shaft form said gearbox;
    a plurality of rectangular vanes having two ends and tow edges, one of said tow edges being attached to said sleeve, the other of said tow edges located proximate to said one side sand said bottom of said rectangular bottom position of said hopper;
    a programmable electronic timer controller attached to said side of said housing, said programmable electronic timer controller having an electrical connection attached to said electric motor, said programmable electronic timer controller also having an electrical connection attached to a 24 volt adapter which provides a source of electricity for energizing said programmable electronic timer controller and said electric motor whereby energizing said motor by said programmable electronic timer controller causes said vanes to rotate a prescribed amount in response to a programmed timer and dispenses a measured amount of dry food in said removable tray.

4. A dispenser of dry animal food as described in claim 3 wherein said back wall of said hopper has a bottom edge with a flexible strip attached thereto.

5. A dispenser of dry animal good as described in claim 4 wherein said flexible strip attached to said back wall of said hopper is of sufficient width to engage the edge of said straight rectangular vanes whereby the rotation of said vanes bend said flexible strip toward the front wall of said housing.

6. A dispenser of dry animal food as described in claim 3 wherein said front wall of said housing has a bottom edge with a flexible strip attached thereto.

7. A dispenser of dry animal food as described in claim 6 wherein said flexible strip attached to the front wall of said housing is of sufficient width to engage the edge of said straight rectangular vanes whereby the rotation of said vanes bend said flexible strip outward toward said front wall of said housing.

8. A dispenser of dry animal food as described in claim 1 wherein said programmable electronically activated food dispensing means further comprises:
 an electric motor having a shaft and a shaft end;
 a gear box attached to said shaft end of said motor with said shaft of said motor engaging said gear box, said gearbox having a shaft projecting form said gearbox;
 a programmable electronic timer controller attached to the side of said housing;
 a plurality of rows of straight flexible vane segments, said rows of straight flexible vane segments being mounted on a sleeve which is fitted over said shaft protruding form said gearbox, said sleeve attached to said shaft protruding from said gearbox by a shaped bore in si sleeve matching a shape on said shaft protruding from said gearbox.

9. A dispenser of dry animal food as described in claim 8 further including a source of electricity for energizing said electronic motor and said programmable electronic timer controller and an electrical connection between said electric motor and said programmable electronic timer controller and further having an electrical connection between said programmable electronic timer controller and a 24 volt adapter.

10. A dispenser of dry animal food as described in claim 8 wherein said front wall of said hopper is the front wall of said housing, said rear wall and said side walls extend sloping inwardly and downwardly, terminating at said rectangular portion at said bottom of said hopper, said rear wall of said hopper has a bottom edge with a flexible strip attached thereto and sad front wall of said housing has a bottom edge with a flexible strip attached thereto.

11. A dispenser of dry animal food as described in claim 8 wherein said energizing said motor by said programmable electronic timer controller causes said segmented flexible vanes to rotate a prescribed amount in response to a programmed timer and dispense a measured amount of dry animal food in said removable tray.

12. A dispenser of dry animal food as described in claim 8 wherein said flexible strip attached to said rear wall of said hopper and said flexible strip attached to said front wall of said housing is of sufficient width to engage the edge of said flexible vane segments whereby the rotation of said flexible vane segments bends said flexible strip attached to the rear wall of said hopper toward the front wall of said housings and the rotation of said flexible vane segments bend said flexible strip attached to the front wall of said housing outward toward said front wall of said housing.

13. A method of dispensing dry animal food comprising:
 providing a housing having a front wall, a back wall, two side walls, said housing having an open bottom and a hinged top with a front latch;
 providing a hopper located and attached to the inside of said housing, said hopper having a wide top portion, a narrow bottom portion, said bottom portion forming a rectangle having two side walls, said hopper holding said dry animal food;
 providing a removal tray attached to the bottom of the front wall of said housing to hold dispensed animal food;
 providing an electric motor having a shaft and a shaft end, said shaft end of said electric motor having a gearbox attached thereto with said motor shaft engaging said gearbox, said gearbox having a shaft projecting therefrom;
 providing a plurality of straight rectangular vanes, said vanes having two ends and two edges, one of said two edges being attached to a sleeve;
 positioning said sleeve over said shaft protruding from said gearbox;
 attaching said sleeve to said shaft protruding form said gearbox by a shaped bore in said sleeve matching a shape on said shaft protruding form said gearbox;
 providing a source of electricity for engaging said electric motor and said programmable electronic timer controller;
 sloping said rear wall and said side walls of said hopper inwardly and downwardly, terminating at said rectangular portion at said bottom of said hopper;
 providing flexible strips attached to the bottom edge of said rear wall of said hopper and the bottom edge of said front wall of said housing.

14. A method of dispensing dry animal food as described in claim 13 wherein said plurality of straight rectangular vanes are segmented.

15. A method of dispensing dry animal food as described in claim 13 wherein energizing said motor by said programmable electronic timer controller causes said vanes to rotate a prescribed amount in response to a programmed time and dispense a measured amount of dry animal food as in said removable tray.

* * * * *